(12) United States Patent
Sandstrom

(10) Patent No.: US 9,338,531 B2
(45) Date of Patent: *May 10, 2016

(54) INPUT-CONTROLLABLE DYNAMIC CROSS-CONNECT

(71) Applicant: Mark Henrik Sandstrom, Helsinki (FI)

(72) Inventor: Mark Henrik Sandstrom, Helsinki (FI)

(*) Notice: Subject to any disclaimer, the term of this patent is extended or adjusted under 35 U.S.C. 154(b) by 0 days.

This patent is subject to a terminal disclaimer.

(21) Appl. No.: 14/690,405

(22) Filed: Apr. 18, 2015

(65) Prior Publication Data

US 2015/0222973 A1    Aug. 6, 2015

Related U.S. Application Data

(63) Continuation of application No. 10/170,260, filed on Jun. 13, 2002, now Pat. No. 9,048,965.

(51) Int. Cl.
*H04J 3/02* (2006.01)
*H04J 3/04* (2006.01)
*H04J 3/16* (2006.01)
*H04Q 11/04* (2006.01)

(52) U.S. Cl.
CPC .............. *H04Q 11/0421* (2013.01); *H04J 3/02* (2013.01); *H04J 3/047* (2013.01); *H04J 3/1611* (2013.01)

(58) Field of Classification Search
None
See application file for complete search history.

(56) References Cited

U.S. PATENT DOCUMENTS

| 6,674,714 | B1* | 1/2004 | Mochizuki | H04J 3/085 370/217 |
| 6,883,084 | B1* | 4/2005 | Donohoe | G06F 9/3001 712/1 |
| 6,888,841 | B1* | 5/2005 | Ozaki | H04L 49/101 370/413 |
| 6,961,343 | B1* | 11/2005 | Yamazaki | H04Q 11/0414 370/352 |
| 2001/0038607 | A1* | 11/2001 | Honda | H04L 49/153 370/218 |

* cited by examiner

*Primary Examiner* — Feben M Haile

(57) ABSTRACT

A multiplexer capable of automatically and dynamically selecting a correct or the best input out of a pre-configurable set of alternative inputs, based on the current status of the alternative inputs. An input status-sensitive, dynamic, M-by-M digital cross-connect can be formed out of an arrangement of M (an integer) instances of such input-controllable dynamic M:1 multiplexers. An application is an SDH/SONET cross-connect system that is able to perform a protection-switch for any number, up to all, of its output paths, simultaneously, if necessary, thereby enabling a short and deterministic latency for individual-path-granular protection-switch process for cross-connects of unlimited capacity. Another application is an SDH/SONET path that can be dynamically shared, even at a single time-slot granularity, among multiple path sources. Such a multi-source-bus configuration of an SDH/SONET path enables allocating network resources dynamically based on the real-time capacity demand patterns, thereby maximizing the network throughput for bursty data traffic.

18 Claims, 7 Drawing Sheets

INPUT-CONTROLLABLE DYNAMIC CROSS-CONNECT

CROSS-REFERENCES TO RELATED APPLICATIONS

This application is a continuation of a U.S. utility patent Ser. No. 10/170,260, filed Jun. 13, 2002, which is incorporated by reference in its entirety. The subject matter of this application is related to and makes references to the following patent applications:

[1] U.S. utility patent application Ser. No. 09/938,014, filing date Aug. 24, 2001, by Mark Henrik Sandstrom, entitled "A System and Method for Maximizing the Traffic Delivery Capacity of Packet Transport Networks via Real-time Traffic Pattern Based Optimization of Transport Capacity Allocation", which is issued as the U.S. Pat. No. 7,349,414.

[2] U.S. Provisional patent application Ser. No. 60/356,503, filing date Feb. 11, 2002, by Mark Henrik Sandstrom, entitled "Real-time Control-Plane for Maximizing Billable-Traffic-Throughput of Packet Transport Networks".

BACKGROUND OF THE INVENTION

1. Technical Field

This invention pertains to the field of digital communications systems, particularly to the field of circuit-switching systems such as digital cross-connects and add-drop multiplexers.

2. Descriptions of the Related Art

The following acronyms are used and referred to herein as follows:
ADM (SDH/SONET) Add-Drop Multiplexer
MSoB Multi-Source Bus
PS Protection Switch
SD Signal Degrade
SDH Synchronous Digital Hierarchy, ITU-T Recommendations G.707, G.783 and G.806
SF Signal Fail
SONET Synchronous Optical Network
STS-1 The base-level SONET signal. For XC purposes, equal to SDH VC-3.
STS-N A SONET signal carrying N (an integer) time-division-multiplexed byte interleaved STS-1 tributaries
TDM Time-Division Multiplexing
XC Cross-connect Communications networks consist of terminal equipment, switches and communications paths (also called as connections, links or circuits) between the terminal equipment and the switches. Typically a switch has a number of input and output i.e. I/O ports, and a path may be routed through such a switch port. The term port is used herein in logical, rather than physical, sense, so that a number of (logical) ports may reside within a single physical interface line of a switch. The switches are able to connect data traffic from its input ports to its outputs ports. Certain type of switches, called circuit-switches, are able to connect paths from its input ports to its output ports. Connecting a path means connecting the signal carried by the path in its entirety from the input port to the output port occupied by the path. A circuit-switch that provides a such path level connectivity among its input and output ports is called a crossconnect (XC).

For network configuration purposes the input and output ports of such an XC system are typically identified by port numbers. E.g., if an XC node had one hundred I/O ports, these I/O ports of it could be identified as port #1 through port #100. The input-output port connection configuration, called an XC table, for such an 100-port XC node is regularly provisioned by the network operator so that per each output port #p (p=1, 2, . . . , 100) is configured the port ID #q (q=1, 2, . . . , 100) of the input port that is to be connected to it. Thus, in the case of the 100-port XC, if an input port #25 is configured to the XC table entry #50, corresponding to the XC output port #50, the path on the input port #25 would be connected to the output port #50 of the XC.

For traffic protection purposes the same traffic could be carried over more than a single path, typically over two diversely routed paths, from its source across a network to its destination. Thus, an XC could, per a single output port of it, receive two input paths that are provisioned to carry the same traffic stream, and the XC should connect, out of the two input paths, to that output port the traffic from that one of the two input paths that has better signal quality. For instance, in the case of the above 100-port XC, suppose that an additional path is provisioned across network to carry the same traffic stream to the XC as the path on the XC input port #25, and that protection path arrives to the XC at its input port #75. Then, if the input signal at port #25 fails, i.e. is under signal fail (SF) condition, or degrades in quality below a specified protection-switch threshold, i.e. is under signal degrade (SD), the signal from the protection path i.e. from input port #75, instead of input port #25, should the connected to the output #50, assuming the input path #75 is of better quality than input #25. The SF and SD conditions are defined for SDH signals in ITU-T Recommendations G.783 and G.841, and both cause a protection switch request called SFprot. This type of a process of changing the XC configuration with the purpose of continuing the traffic stream delivery is called protection switching (PS). A common standard based scheme for the herein discussed path-level protection is called Sub-Network Connection Protection (SNCP), which is defined in ITU-T Recommendations G.841 and G.783. For voice type of or other delay sensitive traffic forms, the protection switching process should be completed in less than 50 ms, as specified in telecommunications standards such as ITU-T Recommendation G.841, in order for the parties communicating over the network to not notice a significant disruption in their communication channel.

The protection-switch completion time objective of 50 ms (from the activation of SFprot) naturally applies for each individual output path of an XC. While performing protection-switching in a conventional fashion, i.e. by a shared microprocessor of the XC system, requires a finite amount of time per each output reconfigured, a protection-switch however could need to be done for any number, up to all, of the output paths of the XC node simultaneously, yet independently for each output path. Thus, if the XC system was able to complete the protection-switch for a single output path in e.g. 5 ms, it could meet the 50 ms PS completion time objective for at most for 10 output paths whose related input paths failed or degraded below the PS initiation criteria simultaneously. This problem currently seriously limits the maximum number of protected paths that can be supported by XC systems in telecommunications networks. It should be further noted that an XC should be able to perform the protection switching at individual path granularity (as opposed to collectively for all or none of its output paths), since it may serve both output paths that have as well as output paths that do not have protecting inputs, and also since some of the outputs may have their currently connected input paths of worse quality than their related protection inputs, while at the same time for some other outputs their currently connected inputs may be of better quality than their protection inputs.

Therefore, a cost-efficient mechanism that would enable an XC to perform a path-level PS within the required PS completion time, regardless of the number of outputs requiring simultaneous PS, is needed in order to improve the cost-efficient scalability and reliability of communications networks.

BRIEF SUMMARY OF THE INVENTION

The present invention, an input-controllable dynamic cross-connect, enables to dynamically and automatically change the connection-configuration of a cross-connect system based on the change in the status of the cross-connect inputs, such that require an input either to be connected to a pre-specified output of the cross-connect, or to connect a pre-specified alternative input to the crossconnect output port to where the input is currently connected. The invention enables a cross-connect system to perform an unlimited number of simultaneous switch-over, such as protection-switch, processes within a minimal and deterministic response time.

DETAILED DESCRIPTION OF THE INVENTION

Figure 1:
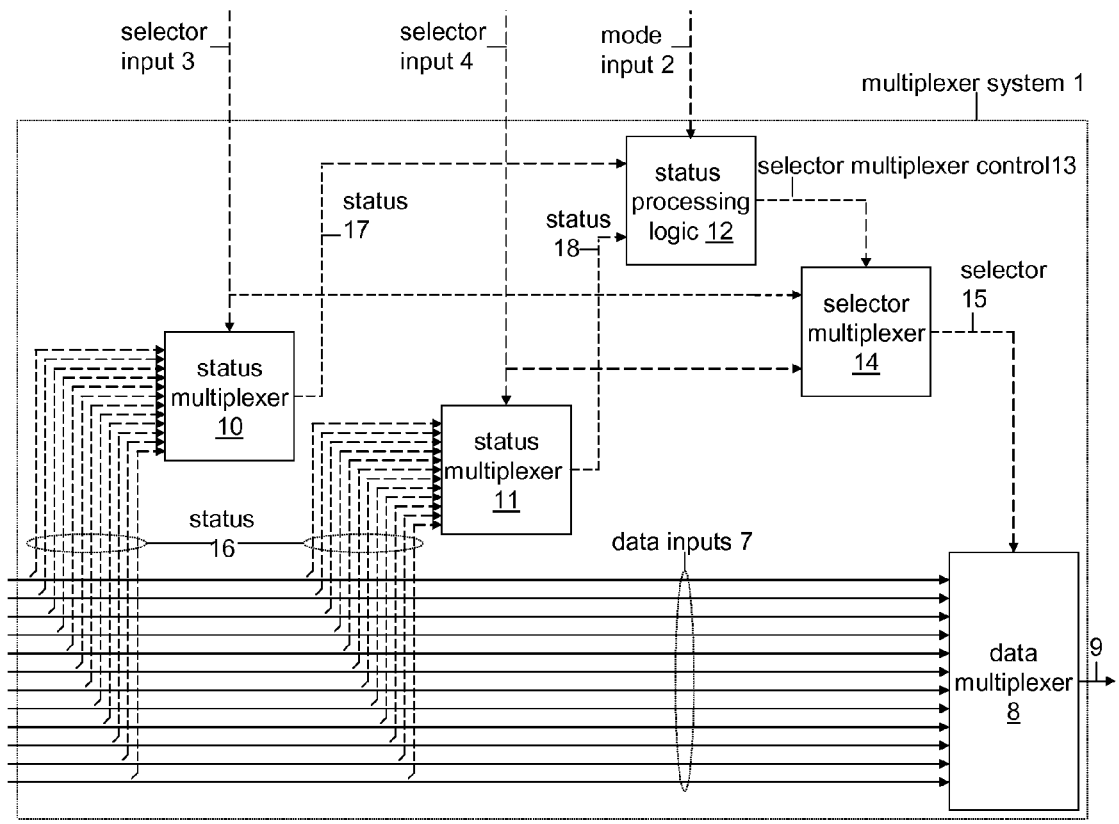
FIG. 1 illustrates a conceptual logic block diagram for a cross-connect output multiplexer system that utilizes the mechanism of the present invention.

The invention is described herein first by illustrating the novel concepts via a more detailed discussion of the drawings, and then by describing a currently preferred embodiment of the invention and its operation.

Symbols and notations used in the drawings:

Solid arrows indicate a data, such as payload traffic, signal flow. Gapped arrows indicate control signal flow. A signal flow may comprise one or more parallel bit wires.

Boxes indicate an implementation of a logic function or module, such as a multiplexer.

Figure 3:
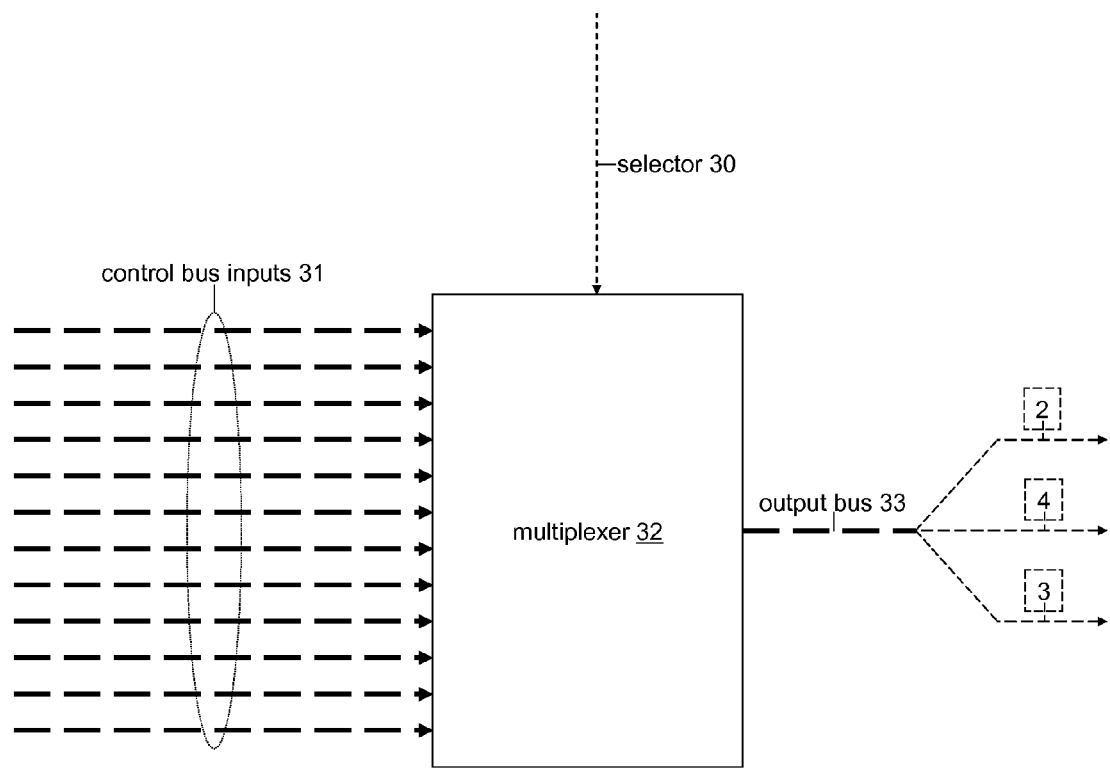
FIG. 3 illustrates a block diagram for an example of additional logic required to time-slice the multiplexer logic of FIG. 1 for a purpose of having the multiplexer efficiently serve TDM signals.

A dotted line marks a border of a group of drawn elements that form a logical entity, such as the modules constituting the multiplexer system 1 in FIG. 1, and the set 31 of input control signal buses in FIG. 3.

Lines or arrows crossing in the drawings are decoupled unless otherwise marked. Arrows ending into or beginning from a bus represent joining or disjoining of a sub-flow of data or control signal into or from the bus, respectively. Bus type of signals, i.e. signals that comprise multiple parallel bit wires or multiple parallel logical signals, are marked with bolded lines or arrows where such differentiation of signal types is necessary.

FIG. 1 illustrates a conceptual logic block diagram for an XC output multiplexer system 1 that employs the mechanism of the present invention. The fundamental operation of multiplexer system 1 is as follows: the data multiplexer 8 connects its input port identified by the selector 15, out of its set 7 of data inputs, to its output 9, i.e., the multiplexer 8 is said to select the data input identified by its selector input 15, and that process of selection by the multiplexer system 1 one of its input ports 7 to its output 9 is referred to as the multiplexing process. The selector 15 is a logical bit vector, and it presents, in a digital form, a number, which identifies a data input port (e.g. 5) of matching port number at the multiplexer 8.

The present invention enables the multiplexer system 1 to select, at a single system clock cycle i.e. at a single signal time-slot granularity, the correct one of out of a set of pre-configured alternative inputs, based on the input signal status info 16 carried in conjunction with its data inputs 7. The status information flows 16, presented in FIG. 1 as gapped arrows departing from the data inputs 7, can represent dedicated physical wires carrying the associated control bits to be selected on to the control signals 17 and 18, in which case out-of-band signaling is said to be used for transfer of status info. Alternatively, the status info flows 16 can represent relevant information fields, such as specified overhead bytes, of the data input signals, based on which their related status is determined, in which case in-band signaling is said to be used for transfer of status info. Naturally, the in-band and out-of-band signaling mechanisms can also be used in a combination. In the drawings attached to this specification, to improve clarity and understandability, a case of two alternative inputs is presented. These two alternative inputs are identified out of the set of data inputs 7 by the values of their associated configurable selector inputs 3 and 4.

In a protection switching (PS) application of the multiplexer system 1, i.e. in the PS mode, wherein the alternative inputs are used to carry two mutually protecting copies of the same signal stream, the input signal status inputs 16 are used to convey current signal quality information, such as a set of defined signal quality parameters, e.g. the current SF and SD status, of their related signals.

Another type of an application for the present invention to enable multiple independent traffic streams, which are expected to require a time-variable amount of bandwidth, to dynamically share a single network path resource. In such an application, referred to herein as the multi-source-bus path (MSoB) mode, in which the invented mechanism enables a single path resource on a wide area network to be dynamically timeshared among multiple path sources, the input status info, the control signal inputs 16, presents for the multiplexer system 1 whether their related data inputs should be connected to the multiplexer output 9. A wide-area-network bus control process, also called a control plane process, such as described in the referenced patent applications [1] and [2], could be used to ensure that exactly one path source may request to be connected to any single timeslot on the multiplexer output 9.

Figure 2:
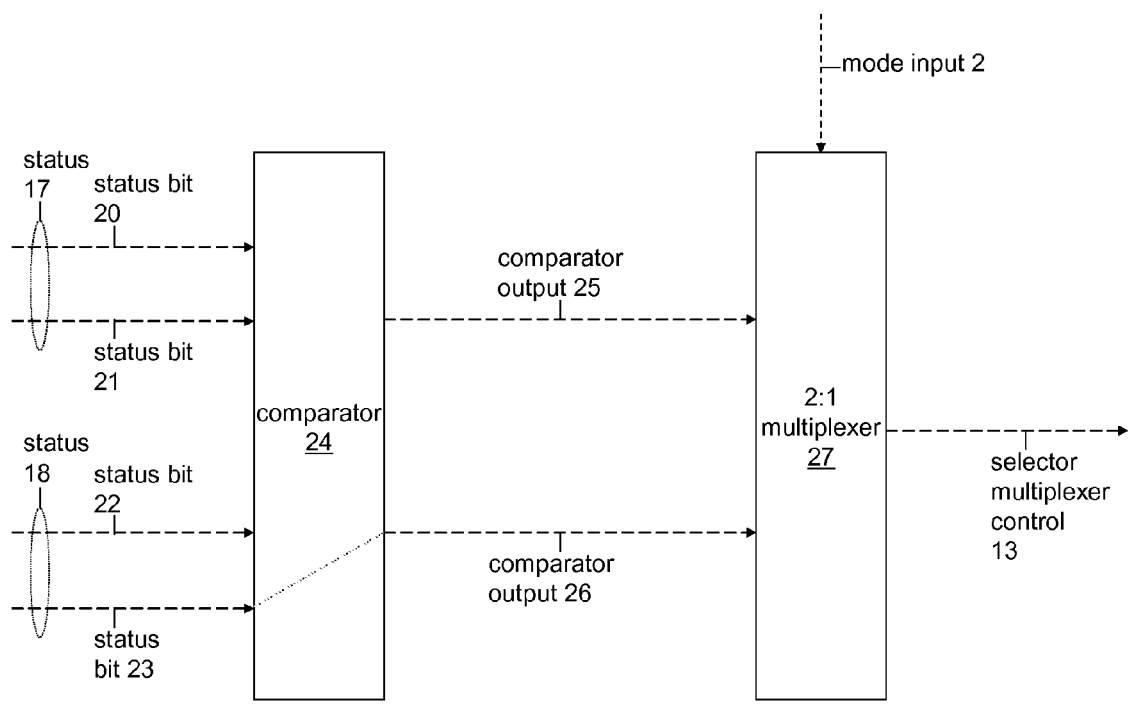
FIG. 2 illustrates a detailed diagram for the logic function of the control logic block 12 of FIG. 1.

FIG. 2 illustrates a possible detailed logic inside the logic block 12 of FIG. 1. The purpose of the logic block 12 is to determine the appropriate alternative input to be selected to the output 9 of the multiplexer system 1, wherein the appropriate alternative input is such one of the alternative inputs that, based on a pre-definable input selection criteria, is the best or equally good as the best, candidate for selection, i.e. an input that best matches the input selection criteria. The output 13 of block 12, which defines which one of the pre-configurable alternative selectors 3 and 4 is selected by the selector multiplexer 14 as the selector input 15 for the data multiplexer 8, is determined by the logic in block 12 by comparing the signal status 17 and 18 of the alternative inputs against the selection criteria, which criteria can be dependent on the application of the multiplexer system, i.e. on the state of the mode input 2. To resolve cases where the status info 17 and 18 of the two alternative inputs indicates that either one could equally well be selected (e.g. when the status 17 and 18 are equal), the selection criteria can include selection priorities for the alternative inputs, so that out of the equal-status alternative inputs the one that has the highest priority is selected.

The outputs 25 and 26 of the comparator 24 for the PS and the MSoB mode, respectively, indicate which one of the alternative inputs should, based on a comparison of their related signal status inputs 17 and 18 with the mode-specific selection criteria, be selected by the data multiplexer 8. The 2:1 multiplexer 27 selects out of the mode-specific outputs 25 and 26 the appropriate one, based on state of the input mode 2, to its output 13.

In the PS mode, selected by a related value of the mode configuration input 2, the multiplexer system 1 needs to select such one of its alternative inputs that, as indicated by the status inputs 17 and 18, has better signal quality. In that mode, if the currently connected input is under an SF condition, as indicated by its related SF status bit (21 or 23, depending on which one of the alternative inputs is currently selected), the logic of FIG. 2 will cause the data multiplexer 8 to select the other one of the alternative inputs if the other input is not under an SF condition. Likewise, in the PS mode, if the currently connected input is under an SD condition, as indicated by its related SD status bit (20 or 22, depending on which one of the alternative inputs is currently selected), the logic will cause the multiplexer 8 to select the other input if the other input is neither under SF nor SD condition.

In the MSoB mode, one of the alternative inputs is a default input, and the other one a non-default input. In this mode, the data multiplexer 8 needs to select the non-default input whenever its status info 18 indicates that the non-default input carries active data traffic, such as an equipped SDH/SONET signal. Thus, assuming the that status bit 23 is used to indicate whether the non-default input is active, the output 26 of the comparator 24 for the MSoB mode can be a copy of the status input bit 23.

FIG. 3 illustrates a block diagram for an additional logic enabling to time-share the multiplexer system 1 of FIG. 1, for the multiplexer system to efficiently support time-division-multiplexed (TDM) data signals, such as SDH/SONET signals. The example logic of FIG. 3 comprises a 12:1 multiplexer 32, which selects, out of the set 31 of twelve control bus inputs, the input control bus identified by its selector input 30, to its output bus port 33. The selector input 30 is used to identify a time-slot order number, which for the example logic of FIG. 3 is an integer between 0 and 11 (inclusive, assuming the timeslots are numbered continuously starting from 0), on the time-division-multiplexed output signal 9 of the multiplexer system 1. If the output signal 9 was an STS-12 SONET signal, the selector input 30 would identify the STS-1 timeslot number on that STS-12 output for which the mode 2 and the selectors 3 and 4 produced by the logic of FIG. 3 apply. With the selectors 3 and 4 and mode 2 inputs of FIG. 1 produced by the logic of FIG. 3, the multiplexer system 1 of FIG. 1 can be used as an efficient, input-controllable dynamic, STS-12 output multiplexer of an STS-1-level XC system. Naturally, replacing the multiplexer 32 of FIG. 3 with e.g. a 48:1 multiplexer enables to use the multiplexer system of FIG. 1 as an efficient STS-48 output multiplexer of an STS-1-level XC, and so forth.

Figure 4:
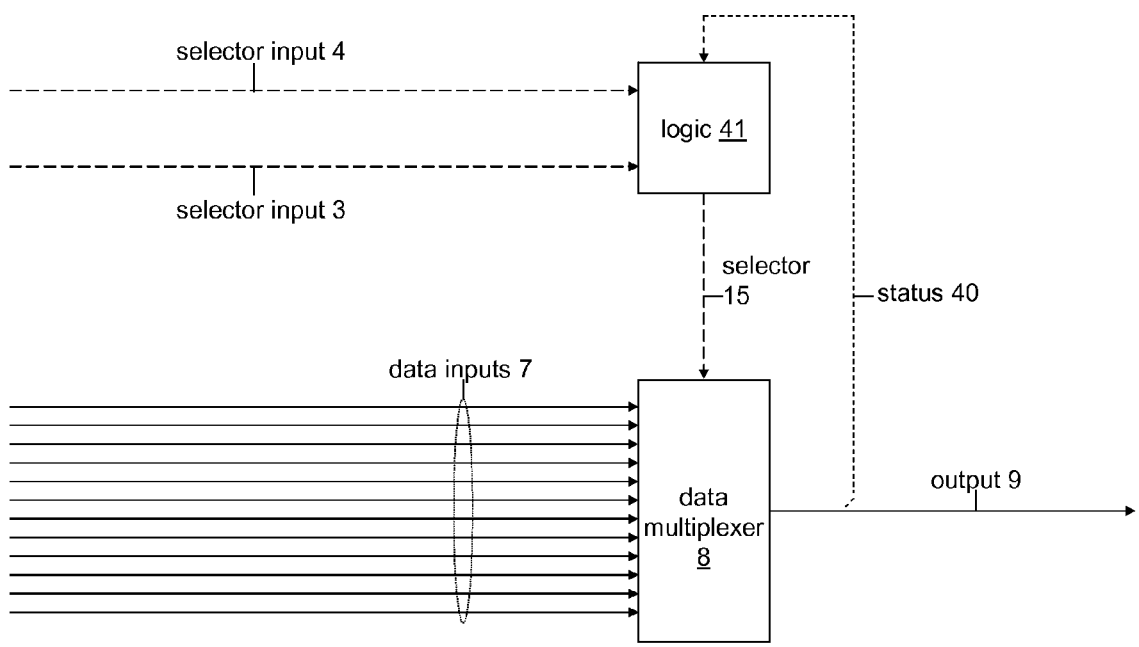
FIG. 4 illustrates a simplified version of the multiplexer system of FIG. 1.

FIG. 4 illustrates a simplified version of the input-controllable multiplexer system of FIG. 1 such that only supports the PS mode, and that monitors the status of its currently selected input at its output port 9, and is thereupon able to dynamically select a new alternative input based on a change in the status of its current output signal. This simplified version takes the status information 40 from the signal selected to its output 9, i.e. only from the currently selected one of its alternative inputs. In addition, it thus uses the data multiplexer 8 also to select the control bits 40 related to the currently selected alternative input, thereby reducing the amount of logic required, in addition to the data multiplexer 8, to accomplish an input-controllable, dynamic multiplexer. The status info 40 of the selected input indicates whether the currently selected input is under a condition, such as SF or SD, that requires a PS to be performed. The logic 41 that selects the final selector 15 switches to the other one of the alternative selectors 3 and 4 in case the status 40 of the currently selected alternative input indicates that a PS is necessary.

Figure 5:
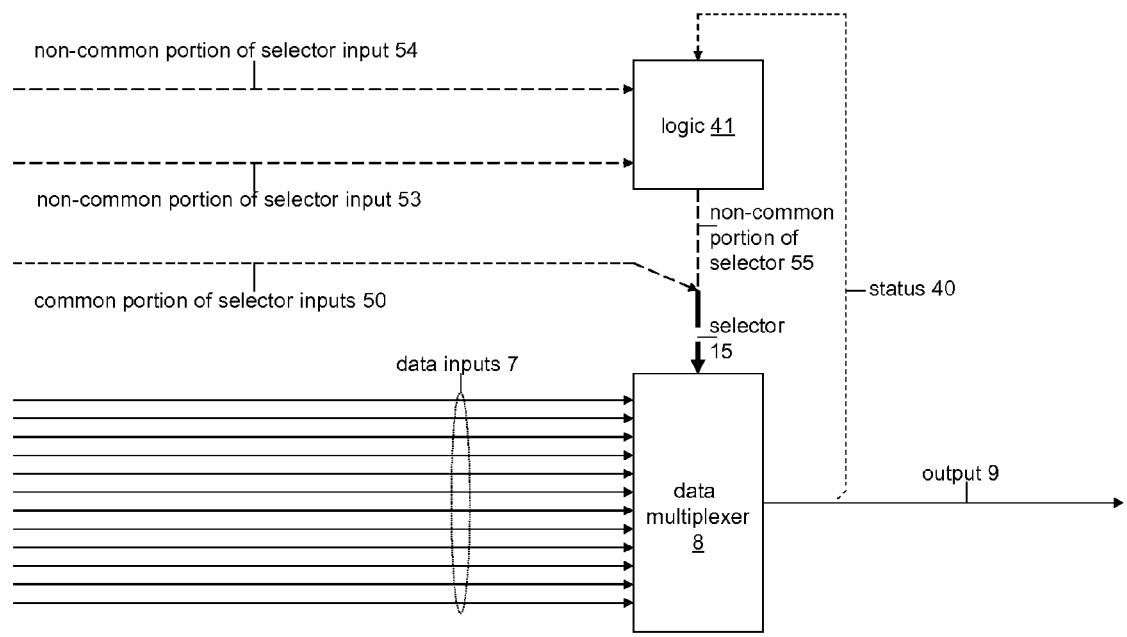
FIG. 5 illustrates a further simplified version of the multiplexer system of FIG. 4.

FIG. 5 illustrates another simplified version of the input-controllable multiplexer system of FIG. 1, one that is further simplified from the version in FIG. 4 such that its two alternative selector bit vectors (3 and 4 in FIG. 1 and FIG. 4) share a common portion 50 (e.g. the most significant bits that define the input STS-1 timeslot number within its STS-N cross-connect input signal), so that the only the potentially non-equal portions 53 and 54 (e.g. the least significant bits that define the cross-connect input STS-N port) of the selector bit vectors need to be individually configurable, and it is only those independently configurable portions 53 and 54 that need to be selected by the logic module 41 to form the final selector 15, which is formed by appending the common bits 50 of the alternative selectors to the non-common bits 55 selected by the logic 41.

Figure 6:
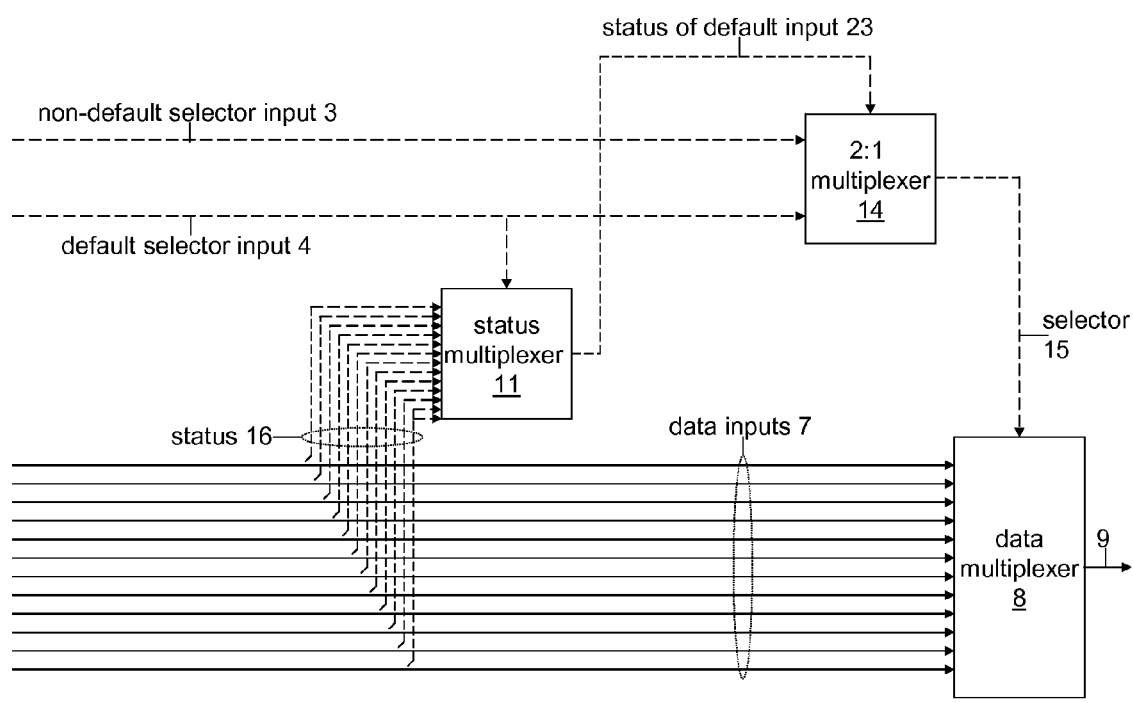
FIG. 6 illustrates another simplified version of the multiplexer system of FIG. 1.

FIG. 6 illustrates a simplified version of the input-controllable multiplexer system of FIG. 1 such that only support the MSoB mode. In this version the 2:1 multiplexer 14 selects the alternative selector 4, which identifies the non-default one of the alternative inputs, whenever the status bit 23 of the non-default alternative input indicates that it is active, and the default selector 3 otherwise. Thus, the data multiplexer 8 will select the non-default input when it is active, and the default input otherwise.

Figure 7:
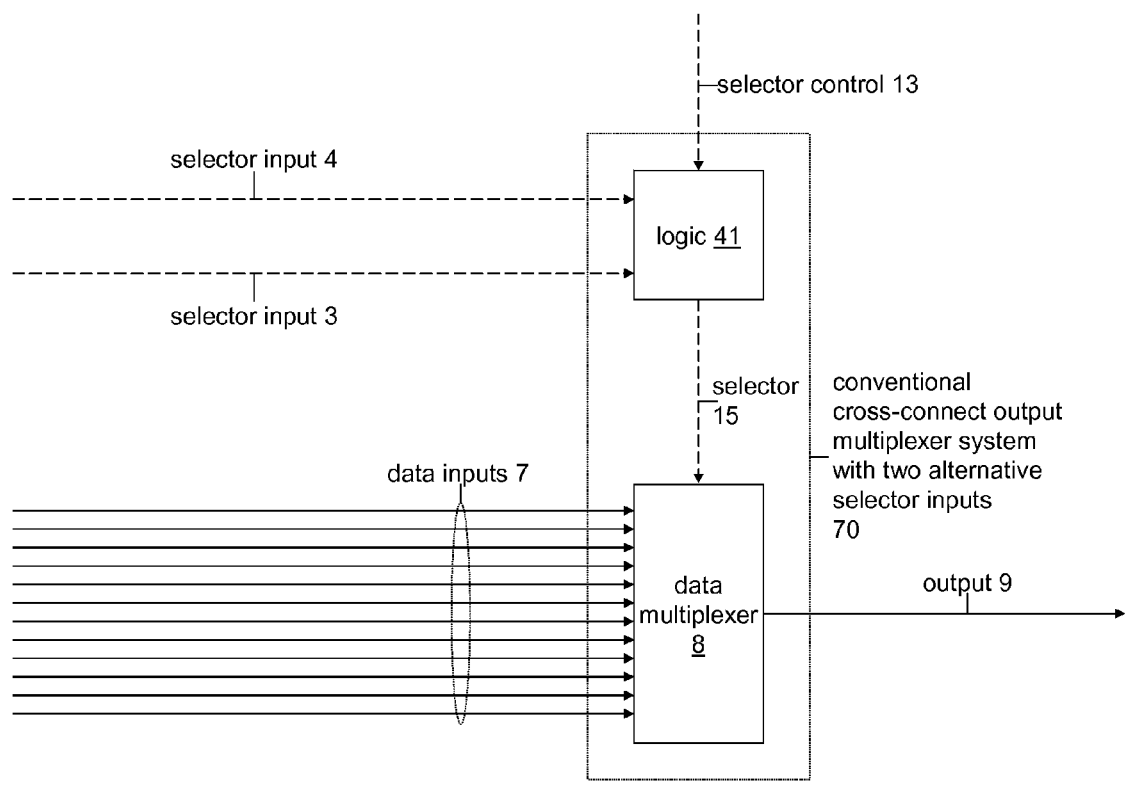
FIG. 7 illustrates, for comparison purposes, a logic block diagram of a conventional cross-connect output multiplexer.

FIG. 7 illustrates, for comparison purposes, a logic block diagram of a conventional XC output multiplexer system 70 that allows pre-configuring two alternative selectors 3 and 4, which typically identify a primary and a protection input, but, unlike the multiplexer system 1 of FIG. 1, is not able to perform a PS automatically based on a change in the status of its alternative inputs. As seen from FIG. 7, a conventional XC output multiplexer system 70 cannot select its final selector 15 automatically, but instead requires an external process, conventionally one that involves a microprocessor, to produce the selector input 13 for it. Worse still, some XC output multiplexers do not support more than one pre-configurable selector, so that in case a new input needs to be selected by the data multiplexer 8 for an output signal, an external, normally software-based, process needs to compute and reconfigure the final selector 15, resulting in an accumulating response time in case that a number of such selector reconfigurations need to be performed over the same time period.

Thus, conventional XC output multiplexers, such as the multiplexer system 70, and XC systems based on such conventional output multiplexers, require the PS processing to be performed externally to the cross-connect output multiplexers, typically by a microprocessor. However, a microprocessor can perform no more than a single PS operation at a time, which results in an accumulating PS completion latency for cross-connect output paths when multiple cross-connect output paths would require a PS simultaneously. This fact limits the maximum number of protected output paths such an XC can support, since it is not a cost-efficient and normally not even a feasible approach to provide multiple microprocessors to control the output multiplexers of a single XC. Additionally, since such conventional XC output multiplexers 70 thus are controllable only by a microprocessor i.e. via software, and not at all through their inputs, XCs based on such conventional, non-input-controllable output multiplexers generally can not support multi-source-bus (MSoB) type of configurations, but instead are limited to single-source buses i.e. non-dynamic point-to-point connections, which cause inefficient utilization of network resources when the traffic, such as Internet traffic, transported by the network is dynamic in its volume and direction distributions.

DESCRIPTION OF PREFERRED EMBODIMENT

General

The currently preferred embodiment of the present invention is a multiplexer system 1 based on the logic block diagrams of FIG. 1, FIG. 2, and FIG. 3, and utilizing the selector logic simplification presented in FIG. 5. A non-blocking XC of M (an integer) I/O ports can be formed by assembling the multiplexer systems 1 such that there is one multiplexer system 1 per each of the M outputs of the XC, and all the M inputs of the XC are routed to each of the M output multiplexers of the XC. Such an XC system, being built of the time-shareable, dynamic, input-controllable multiplexers 1, which each support both the PS and MSoB modes of operation, is an ideal for implementation of generic XC systems, which thus efficiently support multiple types of traffic.

Applications

In particular, an STS-1/VC-n level SDH/SONET XC, that switches STS-1 timeslots, which equal VC-3 paths in SDH terminology, among a number of STS-N (N=3,12,48,192,768 etc) or STM-N input/output ports of the XC, is a major target application of the invention described in detail herein. In such an application, the dynamic, input-controllable cross-connects enable efficiently and flexibly supporting any mix of the below two currently common types of communications traffic:

1) circuit-switched telephony type of traffic, which typically require protection at the SDH/SONET layer;
2) packet-switched Internet type of traffic, which does not necessarily require or significantly benefit from protection at SDH/SONET layer, and which is of bursty nature, i.e. dynamic and unpredictable regarding the momentary capacity requirements of the traffic flows across the communications network.

Naturally, the former type of traffic benefits from the PS mode, and the latter type from the MSoB mode, supported by the XCs based on the XC output multiplexer systems 1. As an additional benefit, such flexibility of the network infrastructure enables efficiently mixing different types of traffic in any proportion in a restriction free manner.

The key attributes of the present invention, with regards to accomplishing the above discussed benefits are:

Automated parallel i.e. distributed processing:

Since each multiplexer system 1 is able to select a new input automatically based on a change in the status of its inputs, the XC based on such input-controllable dynamic multiplexers is able to perform an unlimited number of simultaneous connection changes. This would not be possible with conventional microprocessor based control of XC connections, since a microprocessor requires a finite amount of time per each XC connection change, such as PS, that it performs. Note further that the time a microprocessor requires per a single XC connection change is inherently a lot longer than the duration of a data path clock cycle, in which time frame the multiplexer system 1 is able to selected a new input.

Frame/time-slot accurate, i.e. real-time dynamic, switching:

Since the multiplexer system 1, operating in a regular digital logic system synchronously based on a clock of frequency equal to the data (byte) rates of its input and output signals, monitors the status 17 and 18 of its alternative inputs every system clock cycle, it is able to select the correct data input for every timeslot on its output signal 9, even if the correct input was different for every new output signal timeslot. This capability enables the multiplexer system 1 to perform dynamic switching accurately even at a single (byte) time slot granularity. A possible application for such real-time dynamic switching capability is SDH/SONET based network connections that can be dynamically time-shared i.e. accessed by multiple SDH/SONET path sources, based e.g. on the momentary capacity demand patterns of the path sources towards the destination of such multi-source bus. A system and method for maximizing the throughput of packet transport networks, that can use such multi-source-bus (MSoB) SDH/SONET paths as an underlying data transport layer, is described in the referenced patent applications [1] and [2].

Thus, the ability of the multiplexer system 1 to continuously, every signal timeslot, to monitor and determine the status of its inputs, and immediately respond to a change in the status of its inputs, is in a key role in enabling the benefits of the present innovation. It can be summarized that the additional logic of multiplex system 1, which logic is not included within conventional XC output multiplexer systems 70, while not a major addition to the implementation cost of an XC system, provides the additional distributed processing power required to provide a novel real-time dynamic switching capability for XC systems of unlimited capacity.

Protection Switching Application of the Multiplexer System

For the PS mode, the essential status info 16 of SDH/SONET-type of data input comprise an indication of whether the related current signal quality is adequate or not, i.e. whether the signal quality, as measured e.g. based on a status of a (standard-defined) set of monitored defects, such as Alarm Indication Signal defect (dAIS) or Excessive bit error rate (dEXC) for SDH-paths, is above or below a PS initiation threshold. The PS initiation criteria can generally be determined based on signal fail (SF, inputs 21 and 23 in FIG. 2) and signal degrade (SD, inputs 20 and 22 in FIG. 2) status of the alternative input paths. The SF and SD conditions are defined for SDH-type of signals in ITU-T Recommendations G.806 and G.783. In short, an SD condition means that the signal bit or block error rate is above a specified protection switch initiation threshold, and that "Signal Degraded"-defect (dDEG) is active, while an SF condition on an input path means that the signal is affected by a defect or defects other and more severe than dDEG. At an SDH/SONET network element, the SDH/SONET line, section and path termination (LSPT) logic should detect the SF and SD conditions for the SDH/SONET XC input paths, and, for the currently preferred embodiment, the LSPT logic also explicitly indicates the SF and SD conditions of a (SDH/SONET) path (such an STS-1/VC-3 path) via related out-of-band control bit signals 16 adjacent to the data bytes of the input paths.

Naturally, the SF and SD status of an input signal can also be transferred from the LSPT logic to the multiplexer system using specified in-band signaling channels, in which case the LSPT logic provides the status info 16 for the multiplexer system 1 by asserting certain bit codes of pre-definable semantics in to specified signal frame overhead bit locations. An example of such in-band signaling is an alternative implementation of the present invention where the multiplexer system determines that an input STS-1 path of it is under SF condition when the four most significant bits of the STS-1 pointer byte H1 of the said STS-1 path are all logic ones. Furthermore, the blocks 10 and 11 of FIG. 1 can include additional LSPT logic so that the multiplexer system 1 is able to derive the control signals 17 and 18 for its alternative inputs internally based on processing of the alternative input data signals, such as monitoring their bit or block error rate and detecting signal defects.

Multi-Source Bus Application of the Multiplexer System

For the MSoB mode, the essential input status 16 comprises an indication (input 23 in FIG. 2) of whether the related data input is active, i.e., whether the input is carrying an equipped i.e. an in-service SDH/SONET path, and should thus be selected for connection to the multiplexer output 9. In MSoB mode, one of the alternative data inputs can be a default input, which in FIGS. 1 and 6 is the alternative input identified by the alternative selector 3. Also, per a single stage of multiplexing along the multi-source-bus, there typically is only one alternative, non-default, data input in addition to the default input. In such case, the non-default input, which in FIGS. 1 and 6 is identified by the alternative selector 4, is selected for every output signal timeslot for which the status indicator bit 23 of the non-default input indicates that the non-default input is active on the current (byte) timeslot.

The path sources that are able to dynamically access a single MSoB-configured SDH/SONET path resource, such as an STS-1 channel on an OC-48 ring, through multiplexers systems 1 to which they are inputs, can be synchronously controlled by a real-time network bus control process scheme such as one utilizing the principles described in the referenced patent applications [1] and [2], so that exactly one of the path sources will be active per any single time-slot on the multi-source-bus. Such an MSoB-configured STS-1 channel could be routed across a network through the output ports 9 of multiplexer systems 1 operating in the MSoB mode. On an MSoB, the output 9 from an earlier stage multiplexer system 1 (if any) would be routed across a network to the default input of the next-stage multiplexer system 1 on that MSoB, or to the destination of the MSoB, whichever applicable.

Operation of the Multiplexer System in the Protection-Switch Mode

If configured via the mode selection input 2 in to the PS mode, the multiplexer system 1 operates according to the below principles:

Initially the multiplexer system 1 selects its default (primary) data input, which in FIGS. 1, 4 and 5 is identified by the alternative selector input 3. This can be ensured e.g. by initially configuring both selectors 3 and 4 to a value identifying the default data input, and configuring the selector 4 to a value identifying the non-default (protection) once the default input status 17 indicates that there are no defects with the signal. The multiplexer system 1 selects the default input whenever its associates signal status info 17 indicates that the signal quality of the default input is better than or equal to the signal quality of the non-default input, wherein the signal quality for the non-default input is determined based on its associated status inputs 18, in a similar fashion as with the default input. For SDH type of traffic, and for PS purposes, the signal quality has three grades, the best of which is a state of neither SF nor SD, the second best is a state of SD but no SF, and the worst a state of SF. If the SF status input bit 21 associated with the default input becomes active while the default input is selected, the multiplexer system 1 selects the non-default input, provided that the SF bit 23 of the non-default input is not active. If the SD status input bit 20 associated with the default input becomes active, the multiplexer system 1 selects the non-default input, provided that neither the SF bit 23 nor the SD bit 22 of the non-default input is active. If the SD bit 22 of the non-default input is active while the non-default input is selected, the multiplexer system 1 switches the selection to the default input provided that the SF bit 21 of the default input is inactive. If the SF bit 23 of the non-default input is active, the multiplexer system 1 selects the default input regardless of its status. Thus, in the above described implementation, the default input has a higher priority than the non-default input, and therefore the default input is selected when the two alternative inputs could otherwise be equally well selected.

This process of selecting the better working one of the two alternative inputs, identified by the alternative selectors 3 and 4, which alternative inputs are used to carry copies of the same signal stream, is an example of a type of processes called protection switching (PS) processes in telecommunications industry. The present invention, i.e., an XC output multiplexer system 1 of FIG. 1, is able perform such a PS completely automatically, while a conventional XC output multiplexers systems, such as the multiplexer system 70 shown in FIG. 7, require external, typically software-based, control to perform a PS. The problem with such software control is that it is normally implemented using a shared microprocessor that, while having to perform multiple tasks, is able to do at most one task per a clock cycle, resulting in a non-deterministic and accumulating PS completion latency when multiple tasks, such as PS processes for multiple multiplexers 70, need to be performed simultaneously. In such a case where PS requests are being made for the microprocessor more rapidly than the microprocessor is able to perform the requested PS processes, the PS requests get queued for later processing, instead of getting instantly processed and completed as the multiplexer system 1 is able to do.

Operation of the Multiplexer System in the Multi-Source Bus Mode

If configured via the mode selector input 2 in to the MSoB mode, the multiplexer system 1 operates according to the below principles:

The data multiplexer 8 selects the non-default input, identified by the selector input 4, when ever the signal status info 18 of the non-default input indicates that the non-default input should be connected to the multiplexer output 9; otherwise the data multiplexer 8 selects the default input, which is identified by the selector input 3.

A full network system application for the MSoB mode of the multiplexer system 1 is described in the referenced patent applications [1] and [2]. In particular, the referenced patent applications provide a description for a process for synchronizing the multiple path sources of an multi-source-bus so that any single timeslot on the time-shared multi-source-bus is allocated to exactly one of the sources, yet allowing an optimized utilization and a fully demand-based allocation of the bus capacity among the sources. Overall, the referenced patent applications may be used in conjunction with this description to give a larger understanding of the applications for the MSoB mode of the multiplexer system 1. A major advantage of a multi-source-bus configuration of an SDH/SONET-type of path, compared to a conventional single-source configuration, is that the MSoB configuration allows the destination (sink) of the path to receive data at the full data-rate supported by the path from any one of its sources, while not requiring a dedicated single-source path from each one of the sources, as would be required without the use of the multiplexer systems 1 and the MSoB configuration that they enable. Furthermore, the individual-path-granular dynamic multiplexing achieved by multiplexer systems 1 of FIG. 1 allows forming a logical wide-area-network multi-source-bus such that comprises a number of parallel MSoB paths, so that the capacity of such multi-path MSoB can be dynamically allocated among its sources at a single-path granularity.

CONCLUSION

This detailed description is a specific description of the currently preferred embodiment of the present invention for practical applications discussed in the foregoing. Specific architectural and logic implementation examples are provided for the purpose illustrating a currently preferred practical implementation alternative for the invented concept. Thus, this detail description of the invention and the attached drawings are to be regarded as illustrative rather than restrictive description of the present invention.

Naturally, there are multiple alternative ways to implement or utilize, in whole or in part, the principles of the invention as set forth in the foregoing. Therefore, those skilled in the art will be able to develop different versions and various modifications of the described embodiments, which, although not necessarily each explicitly described herein individually, utilize the principles of the present invention, and are thus included within its spirit and scope. As it thus is obvious that various changes, substitutions, and modifications can be made in to the above described currently preferred embodiments, such modified versions of the described embodiments will be encompassed within the spirit and scope of the present invention, even if all of the features identified above are not present. For example, the system may be differently partitioned into sub-systems, logic blocks and functions. Moreover, the modules, logic blocks, processes, process steps and mechanisms described and illustrated in the drawings and in the description of the preferred embodiment as discrete or separate may be divided in to sub-modules etc, and/or combined or integrated with other modules, blocks, processes, process steps and mechanisms without departing from the spirit and scope of the present invention, which is defined by the claims following.

What is claimed is:

1. A method for dynamically multiplexing data onto a data output, the method comprising, for each given one of a series of multiplexing timeslots:

receiving a set of input signals on a set of data inputs;

forming a selector to identify one of the data inputs based at least in part on a comparison between a status of alternative inputs and a predefined input selection criteria;

connecting to the data output the data input that is identified for a given timeslot by the selector;

choosing the selector from two or more alternative selectors, said alternative selectors identifying their respective alternative inputs from the set of data inputs, so that such one of the alternative selectors, whose associated alternative input's status matches or best matches the predefined selection criteria, will be chosen as the selector for the given timeslot, and wherein the predefined selection criteria is identical for each of the alternative inputs; and performing the method by hardware logic, in which each of the timeslots is a single hardware logic clock cycle for the hardware logic performing the method, wherein the method involves a control process by which for any single timeslot, at most one indicator expresses that its associated data input is to be selected.

2. The method of claim 1, wherein, for each given timeslot, the status of a given one of the alternative inputs expresses whether its associated input is to be connected to the data output on the give timeslot.

3. The method of claim 1, wherein, for each given timeslot, the status of no more than one of the alternative inputs expresses that its associated input is to be connected to the data output on the give timeslot.

4. The method of claim 1, wherein, for each given timeslot, the status of exactly one of the alternative inputs expresses that its associated input is to be connected to the data output on the give timeslot.

5. The method of claim 1, forming a time-division-multiplexed data output signal by time-sharing its logic among a number of logical data channels so that the data contents on the data output on any of its successive timeslots belong to different channels.

6. A multiplexing system, implemented in hardware logic, comprising:

digital hardware logic connecting to a data output one of a set of data inputs that is identified by a selector for a given multiplexing timeslot based at least in part on a comparison between a status of alternative inputs and a predefined input selection criteria;

digital hardware logic choosing the selector from two or more alternative selectors, said alternative selectors identifying their respective alternative inputs from the set of data inputs, so that such one of the alternative selectors, whose associated alternative input's status matches or best matches the predefined selection criteria, will be chosen as the selector for the given timeslot, wherein the predefined selection criteria is identical for each of the alternative inputs; and digital hardware logic in which for any single timeslot, at most one indicator expresses that its associated data input is to be selected, wherein each of the timeslots is a single hardware logic clock cycle for the hardware logic of the system.

7. The system of claim 6, wherein, for each given timeslot, the status of a given one of the alternative inputs expresses whether its associated input is to be connected to the data output on the give timeslot.

8. The system of claim 6, wherein, for each given timeslot, the status of no more than one of the alternative inputs expresses that its associated input is to be connected to the data output on the give timeslot.

9. The system of claim 6, wherein, for each given timeslot, the status of exactly one of the alternative inputs expresses that its associated input is to be selected for the given timeslot.

10. The system of claim 6, wherein the alternative selectors, the selector, the data inputs and the data output are configured to carry digital signals comprising one or more parallel bits per a signal.

11. The system of claim 6, that is configured to form a time-division-multiplexed data output signal by time-sharing the system among a number of logical data channels so that the data contents on the data output on any of its successive timeslots belong to different channels.

12. The system of claim 6, wherein the status of at least one of the alternative inputs is determined at least in part based on a signal overhead field.

13. The system of claim 6, wherein the status of at least one of the alternative inputs is determined at least in part via in-band signaling.

14. The system of claim 6, wherein the status of one or more of the alternative inputs is determined at least in part via out-of-band signaling.

15. The system of claim 6, wherein the alternative inputs have associated priorities, and wherein if there is a set of two or more alternative inputs that could equally well be selected based on their status, out of said set the alternative input that has the highest priority is selected.

16. The system of claim 6, wherein one of the alternative inputs is designated as a default input and the others as non-default inputs, and wherein the system is configured to choose the default input whenever a status of none of the non-default alternative input expresses that a given non-default input should be selected.

17. A method for dynamically multiplexing data onto a data output, the method comprising, for each given one of a series of multiplexing timeslots:
   receiving a set of input signals on a set of data inputs;
   forming a selector to identify one of the data inputs;
   connecting to the data output the data input that is identified for a given timeslot by the selector;
   choosing the selector dynamically based at least in part on a comparison between a status indicator of at least one of the data inputs and a predefined input selection criteria, with said indicator (i) being formed based on how its associated data input matches the predefined selection criteria, and (ii) expressing whether the given data input associated with said indicator is to be selected for the given timeslot; and
   performing the method by hardware logic, in which each of the timeslots is a single hardware logic clock cycle for the hardware logic performing the method, wherein the method involves a control process by which for any single timeslot, at most one indicator expresses that its associated data input is to be selected.

18. A multiplexing system, implemented in hardware logic, comprising:
   digital hardware logic connecting to a data output one of a set of data inputs that is identified by a selector for a given one of series of multiplexing timeslots;
   digital hardware logic forming the selector dynamically based at least in part on a comparison between a status indicator of at least one of the data inputs and a predefined input selection criteria, with said indicator (i) being formed based on how its associated data input matches the predefined selection criteria, and (ii) expressing whether the given data input associated with said indicator is to be selected for the given timeslot; and
   digital hardware logic in which for any single timeslot, at most one indicator expresses that its associated data input is to be selected, wherein each of the timeslots is a single hardware logic clock cycle for the hardware logic of the system.

* * * * *